United States Patent
Shimokawa

(10) Patent No.: US 9,079,488 B2
(45) Date of Patent: Jul. 14, 2015

(54) FUEL TANK STRUCTURE

(75) Inventor: Shinji Shimokawa, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 588 days.

(21) Appl. No.: 13/456,938

(22) Filed: Apr. 26, 2012

(65) Prior Publication Data

US 2012/0298534 A1 Nov. 29, 2012

(30) Foreign Application Priority Data

May 24, 2011 (JP) ................. 2011-115921

(51) Int. Cl.
*F02M 25/08* (2006.01)
*B60K 15/03* (2006.01)

(52) U.S. Cl.
CPC ....... *B60K 15/03* (2013.01); *B60K 2015/03263* (2013.01); *B60K 2015/03296* (2013.01)

(58) Field of Classification Search
CPC .......... F02M 25/0836; F02M 25/0854; F02M 25/089
USPC ........... 123/516, 518, 519; 137/125, 587–590
See application file for complete search history.

(56) References Cited

U.S. PATENT DOCUMENTS

| | | | | |
|---|---|---|---|---|
| 5,590,697 A | * | 1/1997 | Benjey et al. | 141/59 |
| 5,640,993 A | * | 6/1997 | Kasugai et al. | 137/587 |
| 5,762,090 A | * | 6/1998 | Halamish et al. | 137/43 |
| 5,782,258 A | * | 7/1998 | Herbon et al. | 137/43 |
| 6,405,747 B1 | * | 6/2002 | King et al. | 137/202 |
| 6,655,403 B2 | * | 12/2003 | Mills | 137/2 |
| 6,810,900 B2 | * | 11/2004 | Kato | 137/202 |
| 6,951,209 B2 | * | 10/2005 | Yanase et al. | 123/516 |
| 2008/0041347 A1 | * | 2/2008 | Mills | 123/518 |
| 2012/0024853 A1 | | 2/2012 | Kuwayama et al. | |

FOREIGN PATENT DOCUMENTS

| | | |
|---|---|---|
| JP | A-2004-100622 | 4/2004 |
| JP | A-2010-173467 | 8/2010 |
| JP | A-2012-47169 | 3/2012 |

* cited by examiner

*Primary Examiner* — John Kwon
*Assistant Examiner* — Johnny H Hoang
(74) *Attorney, Agent, or Firm* — Oliff PLC

(57) ABSTRACT

An internal pressure control valve is provided in a branch pipe communicating a fuel tank with a canister. The internal pressure control valve maintains the internal pressure of the fuel tank at a head pressure of the fuel in a filling pipe for a predetermined time after filling.

8 Claims, 6 Drawing Sheets

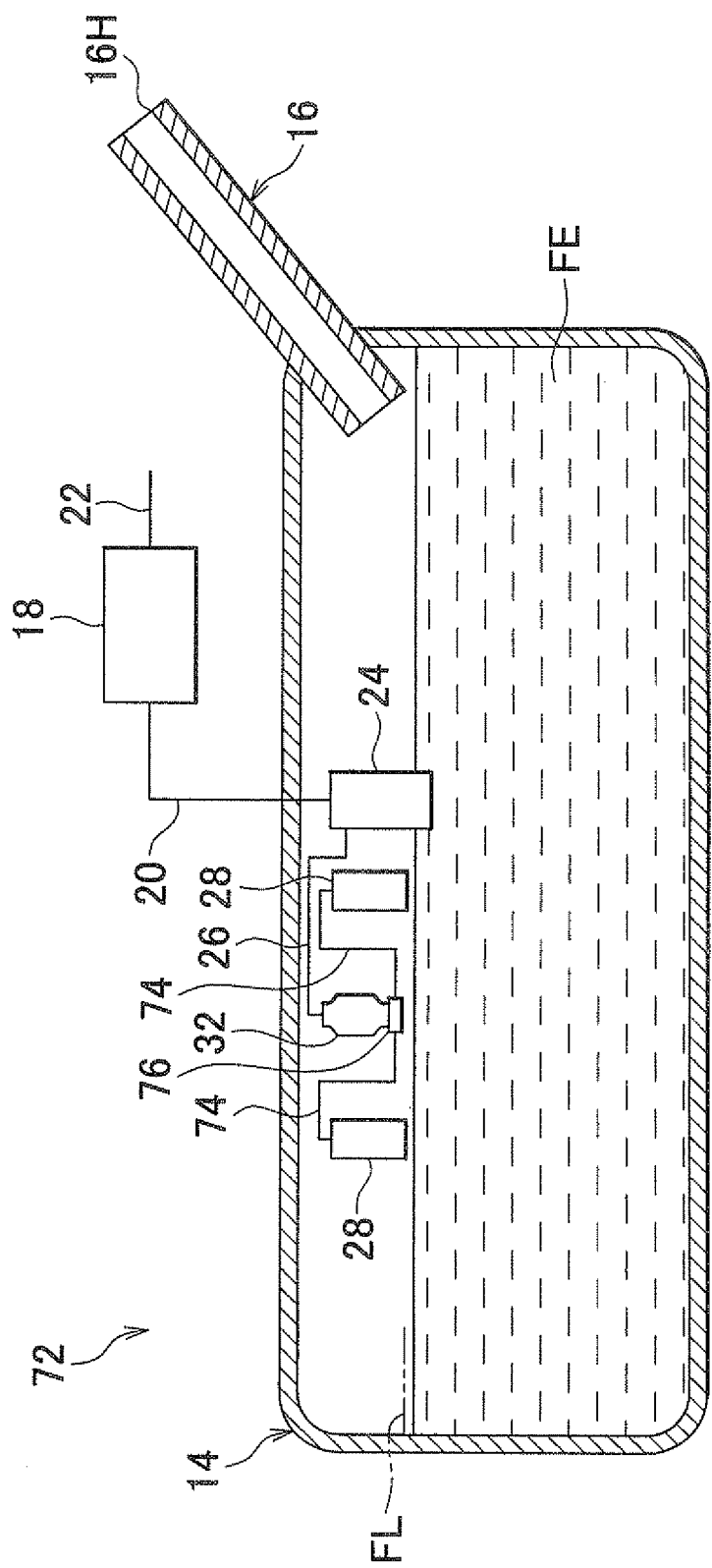

FUEL TANK STRUCTURE

INCORPORATION BY REFERENCE

The disclosure of Japanese Patent Application No. 2011-115921 filed on May 24, 2011 including the specification, drawings and abstract is incorporated herein by reference in its entirety.

BACKGROUND OF THE INVENTION

1. Field of the Invention

The invention relates to a fuel tank structure, and more particularly to a fuel tank structure that can prevent a fuel tank from being overfilled.

2. Description of Related Art

In order to prevent a fuel tank from being overfilled, for example, Japanese Patent Application Publication No. 2004-100622 (JP 2004-100622 A) describes a structure in which a float valve is provided in a first fuel vapor passage connecting the fuel tank with a canister, and the first fuel vapor passage is closed when the fuel tank is in a filled-up state.

The structure described in JP 2004-100622 A is also provided with a check valve that is opened when the pressure in the fuel tank rises to a level equal to or higher than a predetermined value even after the float valve has been closed.

Thus, in the structure described in JP 2004-100622 A, even when the fuel tank is in a filled-up state and the float valve is closed, the check valve is opened and the internal pressure of the fuel tank decreases. Therefore, the fuel present in the fuel feed pipe can flow down, thereby causing overfilling.

SUMMARY OF THE INVENTION

The invention provides a fuel tank structure that very effectively prevents a fuel tank from being overfilled.

The fuel tank structure according to an aspect of the invention has a fuel tank that accommodates a fuel inside thereof; a canister for adsorbs fuel vapor present in the fuel tank with an adsorber; a filled-up state regulating valve that is provided inside the fuel tank and closed when a fuel level inside the fuel tank reaches a predetermined filled-up state liquid level; a first pipe that communicates the fuel tank and the canister and is opened and closed by the filled-up state regulating valve; a second pipe that communicates the fuel tank and the canister; a filling pipe that is used for supplying fuel to the fuel tank and extends from the fuel tank to a position that is higher than the filled-up state liquid level; and an internal pressure control valve that is provided in the second pipe and restricts gas movement from the fuel tank to the canister so that an internal pressure of the tank is maintained at a head pressure of the fuel that has risen inside the filling pipe in a closed state of the filled-up state regulating valve.

In such a fuel tank structure, when the fuel is supplied through the filling pipe, the filled-up state regulating valve is opened and the gas present inside the fuel tank flows through the first pipe into the canister (fuel vapor contained in the gas that has flown into the canister is adsorbed by the adsorbent) before the level of fuel inside the fuel tank reaches the filled-up state level. Therefore, the fuel can be continuously supplied into the fuel tank.

Where the fuel level inside the fuel tank has not reached the filled-up state level, the filled-up state regulating valve is closed. Therefore, the gas present inside the fuel tank does not flow into the canister through the first pipe. In this case, the supplied fuel rises inside the filling pipe and reaches the filling gun. Therefore, the filling is stopped by the autostop function of the filling gun.

The internal pressure control valve is provided in the second pipe. The internal pressure control valve restricts the movement of fluid from the fuel tank into the canister, thereby maintaining the internal pressure of the fuel tank at the head level in the filling pipe even when the filled-up state regulating valve is in the closed state. As a result, the fuel present inside the filling pipe is prevented from flowing down into the fuel tank. Therefore, the state in which the filling is stopped is maintained and overfilling is prevented.

The expression "maintained at the head pressure" used herein is not limited to the case where the state in which the internal pressure of the fuel tank is higher than the head pressure of the fuel that has risen inside the filling pipe can be maintained. Thus, even in a state in which the internal tank pressure is lower than the head pressure of the fuel in the filling pipe, the internal pressure of the fuel tank may be maintained to a degree such that the time period in which the fuel is present (does not flow down) in the filling pipe lasts long enough for a person performing the filling operation to stop the filling after the autostop of the filling gun has been actuated. For example, even if the internal tank pressure temporarily decreases, the internal pressure may be maintained to a degree such that the fuel in the filling pipe does not separate from the filling gun.

The above-described configuration may include a cut-off valve that is provided in the second pipe at a position that is higher than the filled-up state liquid level inside the fuel tank and is opened to open the second pipe when the internal pressure of the fuel tank exceeds a predetermined value.

With such a configuration, where the internal tank pressure exceeds a predetermined value, the cut-off valve is opened and the gas present in the fuel tank can move through the second pipe into the canister. As a result, the excess increase in the internal pressure of the fuel tank can be prevented.

In the above-described configuration, the internal pressure control valve may have a valve member that is moved from an open valve position to a closed valve position by the internal pressure of the fuel tank when the fuel tank is in a filled-up state, and restricts the gas movement from the fuel tank to the canister through the second pipe.

Where the fuel tank is full and the filled-up state regulating valve is closed, the internal pressure of the fuel tank rises within a short time period. The flow of gas with a high flow velocity acts upon the valve member and the valve member is moved from a valve open position to a valve close position. With such a simple structure that moves the valve member to the closed position by using effectively the internal pressure of the fuel tank, it is possible to maintain the internal pressure of the fuel tank at the head pressure in the filling pipe when the tank is full.

In the above-described configuration, the internal pressure control valve may have an orifice that creates a resistance to the gas movement from the fuel tank to the canister, when the valve member is moved to the open valve position.

With such a configuration, in a state in which the valve member has been moved to the open valve position, the orifice restricts the movement of fluid from the fuel tank to the canister, but still allows for a very small movement. Since the gas present in the fuel tank thus moves by very small amounts into the canister, the internal pressure of the fuel tank can be gradually decreased. As a result, the valve member is moved (returned) to the open valve position.

Where the abovementioned features are used in the above-described embodiment, the effect of preventing the fuel tank from being overfilled is augmented.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6 is a schematic configuration diagram illustrating the fuel tank structure according to the second embodiment of the invention.

DETAILED DESCRIPTION OF EMBODIMENTS

Figure 1:
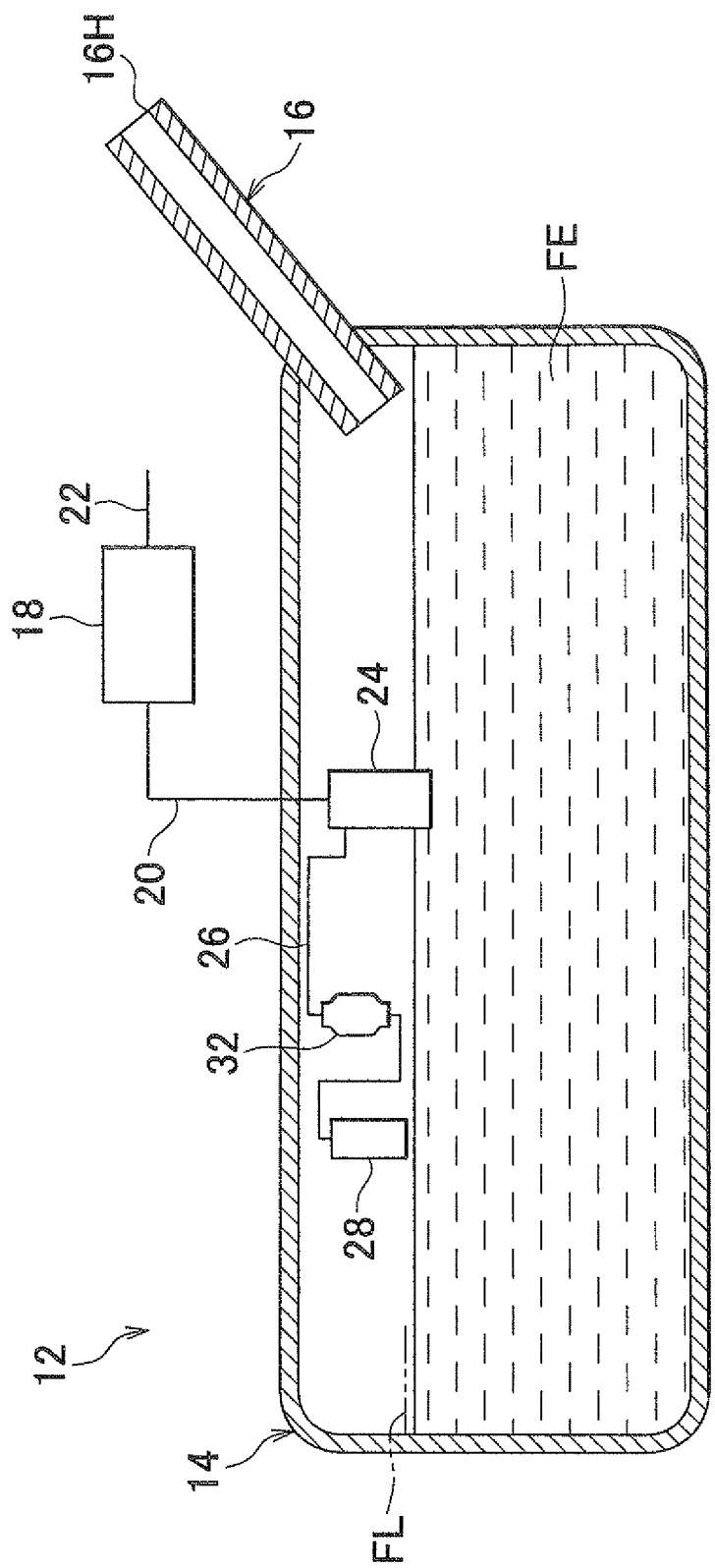
FIG. 1 is a schematic configuration diagram illustrating the fuel tank structure according to the first embodiment of the invention.
Figure 2:
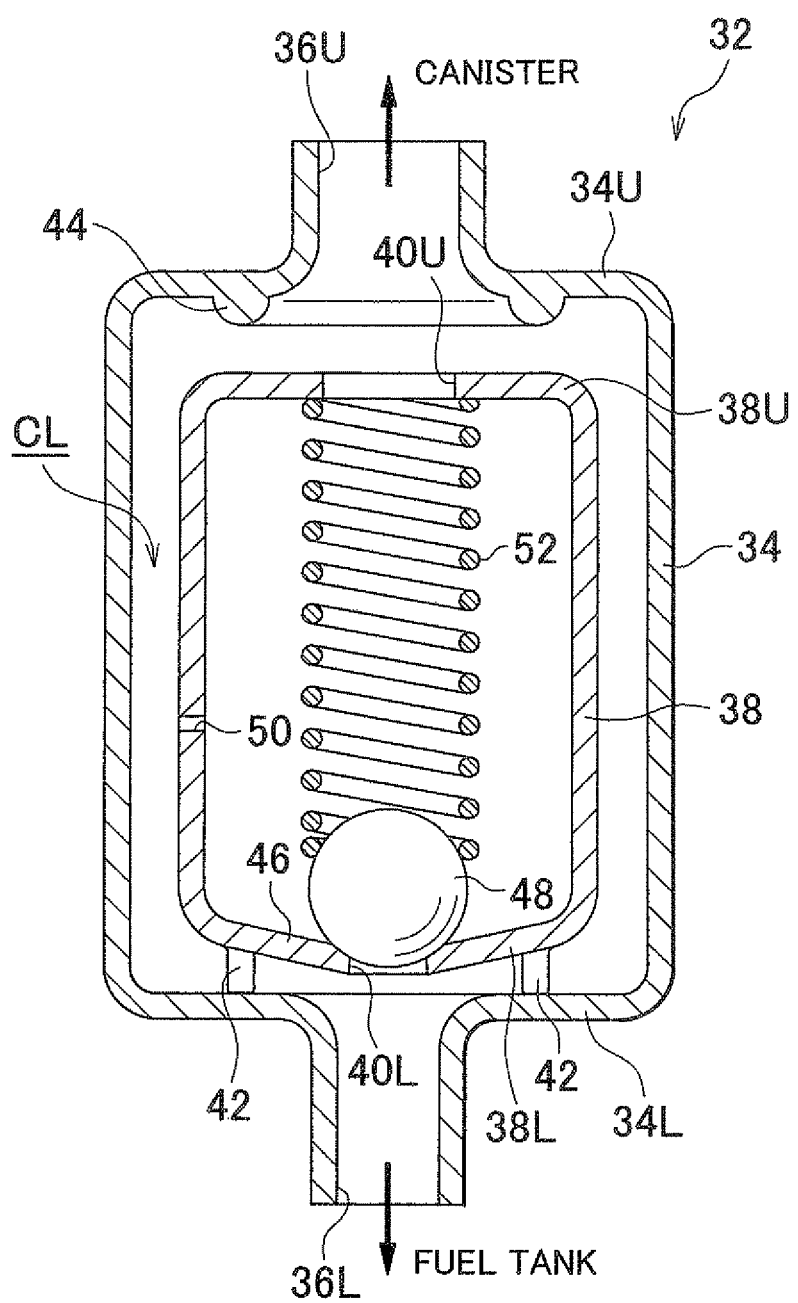
FIG. 2 is a cross-sectional view of the internal pressure control valve constituting the fuel tank structure according to the first embodiment of the invention.
Figure 3:
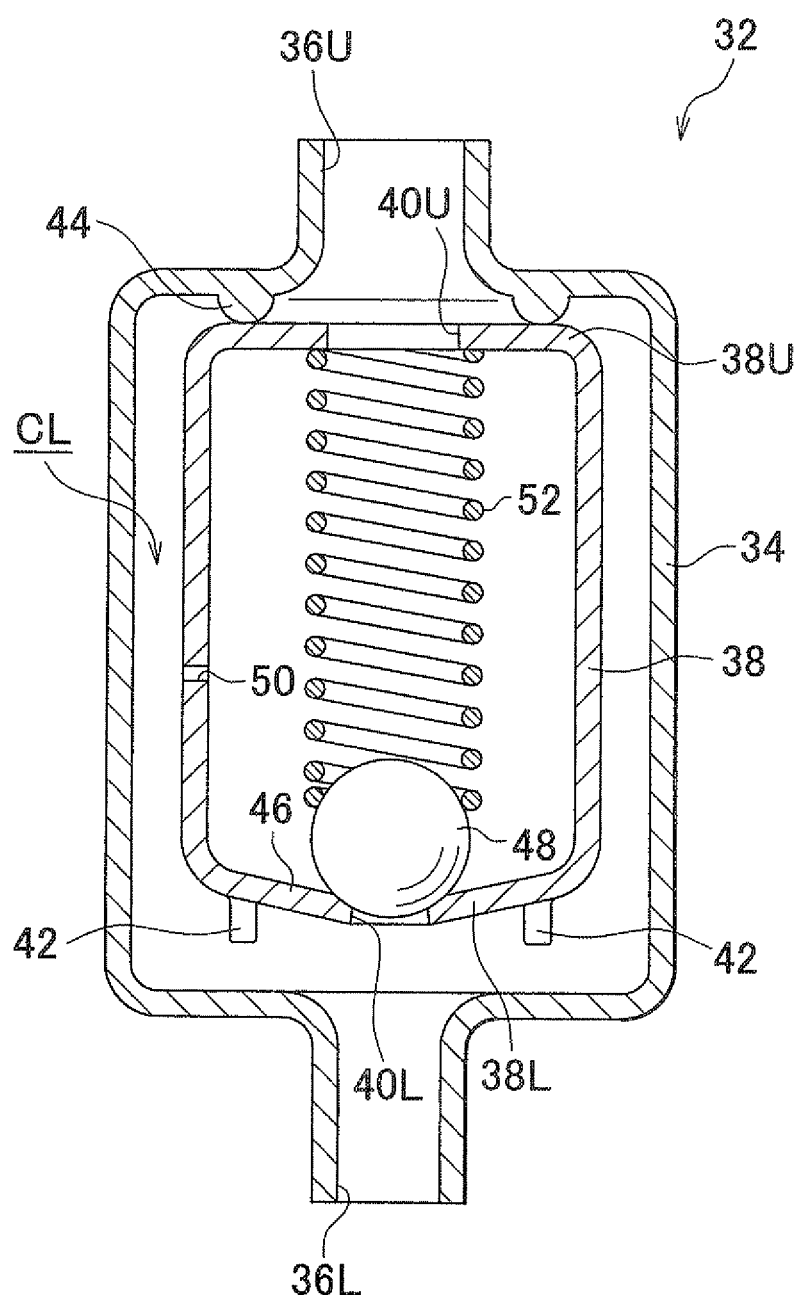
FIG. 3 is a cross-sectional view of the internal pressure control valve constituting the fuel tank structure according to the first embodiment of the invention.
Figure 4:
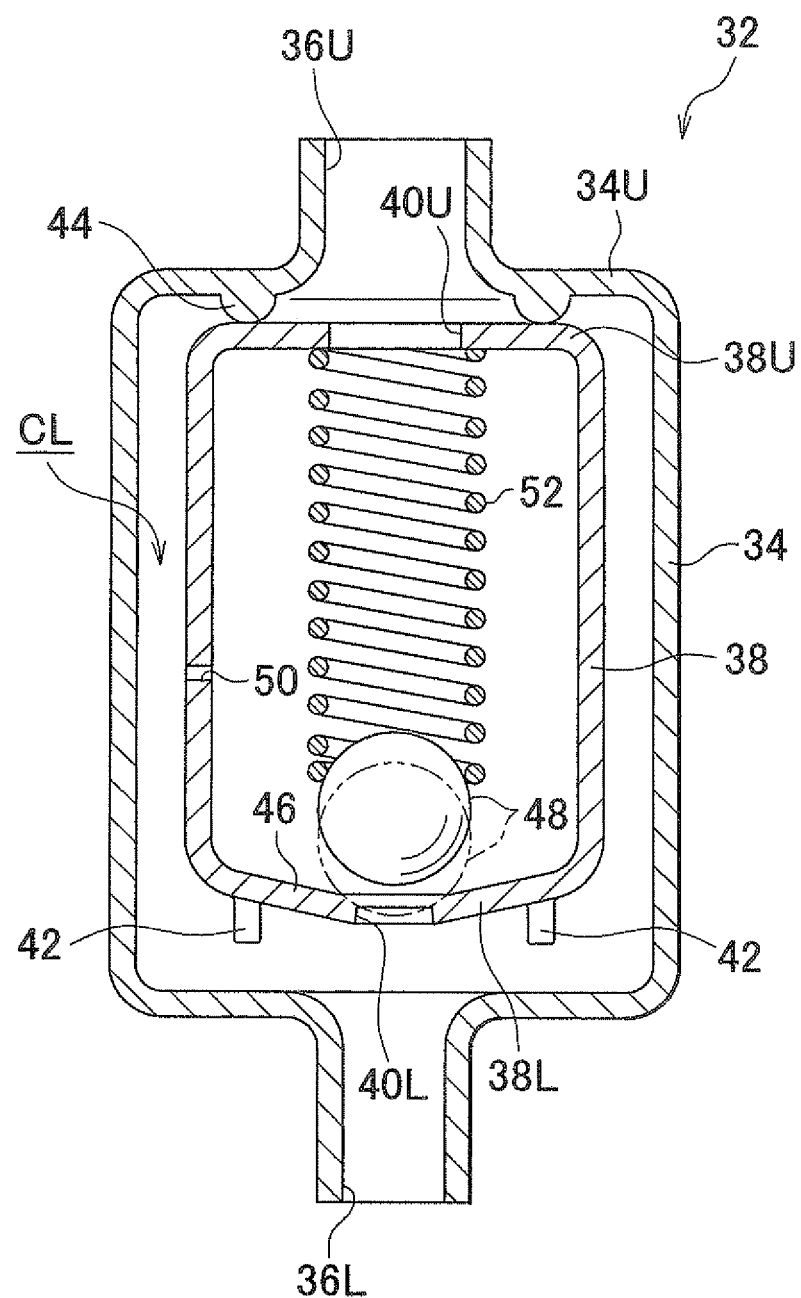
FIG. 4 is a cross-sectional view of the internal pressure control valve constituting the fuel tank structure according to the first embodiment of the invention.

FIG. 1 shows a fuel tank structure 12 according to the first embodiment of the invention. FIGS. 2 to 4 are cross sectional views illustrating an internal pressure control valve 32 constituting the fuel tank structure 12.

The fuel tank structure 12 has a fuel tank 14 that accommodates a fuel inside thereof. The lower end portion of a filling pipe 16 is connected to the upper portion of the fuel tank. An open portion at the upper end of the filling pipe 16 is a filling port 16H. The fuel tank 14 can be filled by inserting a filling gun into the filling port 16H.

A canister 18 accommodating an adsorbent such as activated coal inside thereof is provided outside the fuel tank 14. The gas layer inside the fuel tank 14 and the canister 18 are connected by a common pipe 20, and the gas present inside the fuel tank 14 can be caused to flow into the canister 18. The fuel vapor in the gas that has flown into the canister is adsorbed by the adsorbent in the canister 18, and the gas (atmospheric gas component) other than the fuel vapor is discharged from an atmosphere communication pipe 22 to the atmosphere. In the present embodiment, the common pipe 20 functions as the first pipe in accordance with the invention.

A filled-up state regulating valve 24 is provided at the lower end of the common pipe 20 so as to be positioned in the upper portion inside the fuel tank 14. The filled-up state regulating valve 24 is the so-called float valve and has a float (not shown in the figure) floating on the fuel FE. Before the level of the fuel FE inside the fuel tank 14 reaches the filled-up state level FL, the float cannot float on the fuel, but where the fuel FE reaches the filled-up state level FL, the float of the filled-up state regulating valve 24 floats on the fuel FE and the filled-up state regulating valve 24 becomes closed. In this state, the common pipe 20 is also closed. Therefore, the movement of gas from the fuel tank 14 to the canister 18 through the common pipe 20 can be prevented.

A branch pipe 26 extends from the upper portion of the filled-up state regulating valve 24. In the present embodiment, the gas can move from the below-described cut-off valve 28 to the canister 18 through the branch pipe 26 and the common pipe 20. In the present embodiment, the branch pipe 26 and the common pipe 20 functions as the second pipe in accordance with the invention. In other words, in the common pipe 20, the first pipe and the second pipe are combined at the canister 18 side with respect to the filled-up state regulating valve 24, thereby making it possible to simplify the structure.

The cut-off valve 28 is provided at the distal end (lower end) of the branch pipe 26. The cut-off valve 28 is provided at a position higher than the filled-up state regulating valve 24 inside the fuel tank 14. The cut-off valve 28 is opened when the internal pressure of the fuel tank 14 rises and exceeds a predetermined value, thereby allowing the gas present inside the fuel tank 14 to flow into the canister 18. For example, even when the filled-up state regulating valve 24 is closed, the gas present inside the fuel tank 14 can be allowed to move to the canister 18 by opening the cut-off valve 28. As a result, the excess increase in the internal pressure of the fuel tank 14 can be prevented.

The internal pressure control valve 32 is provided in the intermediate position of the branch pipe 26 (between the cut-off valve 28 and the canister 18). As also shown in FIG. 2, the internal pressure control valve 32 has a valve housing 34 formed in a substantially cylindrical shape. The valve housing 34 is attached to the branch pipe 26. An upper opening 36U formed in an upper wall 34U of the valve housing 34 is positioned at the branch pipe 26 at the canister 18 side. A lower opening 36L formed in a lower wall 34L of the valve housing 34 is positioned at the branch pipe 26 at the fuel tank 14 side.

A first valve body 38 is accommodated inside the valve housing 34. The first valve body 38 is formed in a substantially cylindrical shape, and a predetermined clearance CL is formed between the inner circumferential surface of the valve housing 34 and the outer circumferential surface of the first valve body 38. The first valve body 38 can be moved up and down inside the valve housing 34. The first valve body 38 is an example of the valve member in accordance with the invention.

An upper opening 40U facing the upper opening 36U of the valve housing 34 is formed in an upper wall 38U of the first valve body 38. Likewise, a lower opening 40L facing the lower opening 36L of the valve housing 34 is formed in a lower wall 38L of the first valve body 38. The upper opening 36U and the upper opening 40U and also the lower opening 36L and the lower opening 40L are formed substantially parallel to each other.

An annular seal portion 44 facing the upper surface of the first valve body 38 is formed at the lower surface of the upper wall 34U of the valve housing 34. Were the first valve body 38 rises and comes into contact with the seal portion 44 over the entire circumference, the gas is prevented from moving between the clearance CL and the upper opening 36U.

A plurality of leg portions 42 protruding downward are formed at the lower wall 38L of the first valve body 38. The leg portions 42 are formed with a predetermined spacing in the circumferential direction of the first valve body 38. The leg portions 42 come into contact with the lower wall 34 L of the valve housing 34 when the first valve body 38 is moved down. However, the gas can still move between the clearance CL and the lower opening 36L in this state.

A second valve body 48 is accommodated inside the first valve body 38. The second valve body 48 is formed, for example, in a substantially spherical shape and the outer diameter thereof (width in FIG. 2) is less than the inner diameter of the first valve body 38, thereby allowing the second valve body to be moved up and down inside the first valve body 38. A compression coil spring 52 is accommodated inside the first valve body 38. The compression coil spring 52 pushes the second valve body 48 toward the lower opening 40L by a predetermined elastic force.

The outer diameter of the second valve body 48 is larger than the diameter of the lower opening 40L of the first valve body 38, and where the second valve body descends inside the first valve body 38, the second valve body comes into contact with the edge of the lower opening 40L along the entire circumference. As a result, the gas is prevented from moving through the lower opening 40L.

The upper surface of the lower wall 38L of the first valve body 38 is an inclined surface 46 inclined in an inverted conical manner toward the lower opening 40L. The second valve body 48 is guided by the inclined surface 46 to the center of the lower opening 40L when the second valve body descends.

The first valve body 38, the second valve body 48, and the compression coil spring 52 are configured to have a predetermined combined weight such that when the fuel tank 14 is in a filled-up state and the filled-up state regulating valve 24 is closed, the first valve body 38 and the second valve body 48 rise under the action of the flow of gas inside the fuel tank 14, this action being produced from the lower opening 36L. A predetermined valve-opening pressure is set such that when the pressure acting from the fuel tank 14 decreases and becomes a predetermined valve-opening pressure, the first valve body 38 descends and withdraws from the seal portion 44.

The pressure (valve-opening pressure when the second valve body 48 is opened) acting when the second valve body 48 rises with respect to the first valve body 38 and withdraws from the edge of the lower opening 40L is substantially equal to or slightly lower than the head pressure of the fuel remaining inside the filling pipe 16.

An orifice 50 in the form of a small hole (for example, a round hole with a diameter of equal to or less than 0.5 mm) is formed in the side surface of the first valve body 38. The orifice 50 allows the gas to move between the inside and the outside (however, inside the valve housing 34, that is, in the clearance CL) of the first valve body 38. Since the orifice 50 is in the form of a small hole, a predetermined resistance is offered to the movement of the gas.

The operation of the fuel tank structure 12 according to the present embodiment will be explained below.

Figure 5:
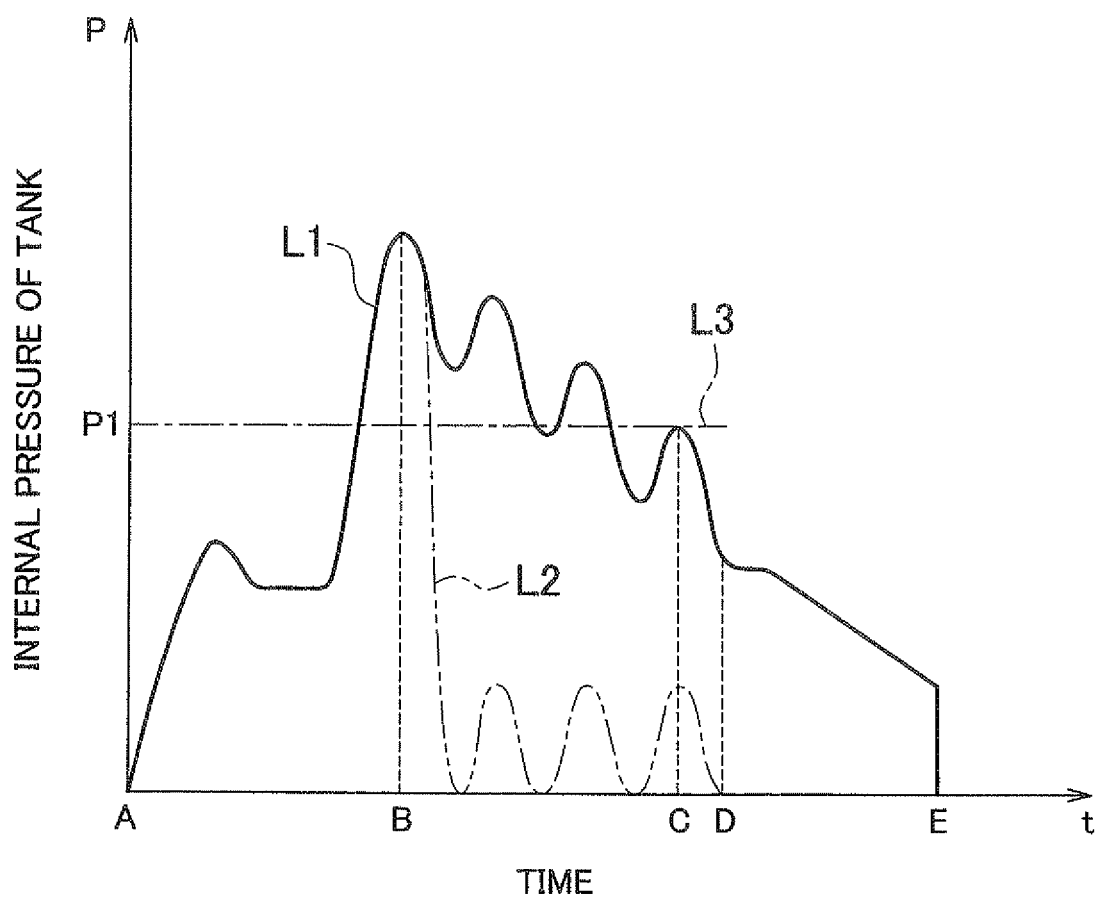
FIG. 5 is a graph illustrating the variation of the internal pressure of the fuel tank during filling with time.

When the fuel tank 14 is filled, a filling gun (not shown in the figure) is inserted into the filling port 16H at the upper end of the filling pipe 16. During filling, the internal pressure of the fuel tank 14 changes according to the amount of fuel inside the fuel tank 14 and the state of the filled-up state regulating valve 24. FIG. 5 shows how the internal pressure P of the fuel tank 14 changes steadily with the passage of time t after the filling has been started. In the graph, the head pressure (P1) of the fuel that has risen inside the filling pipe 16 and reached the filling gun is shown by a dot-dash line L3.

Before the level of fuel FE inside the fuel tank 14 reaches the filled-up state level FL (time period between A and B in FIG. 5), the filled-up state regulating valve 24 is opened. Since the gas present inside the fuel tank 14 moves into the canister 18, the fuel tank 14 can be continuously filled. In this state, the first valve body 38 of the internal pressure control valve 32 descends as shown in FIG. 2.

Where the level of fuel FE inside the fuel tank 14 reaches the filled-up state level FL (point of time B in FIG. 5), the filled-up state regulating valve 24 is closed.

Therefore, the internal pressure P of the fuel tank 14 rises within a short time period. In this state, the cut-off valve 28 is opened, and the pressure inside the fuel tank 14 acts upon the internal pressure control valve 32 (substantially as gas with a high flow velocity). Therefore, in the filled-up state or immediately therebefore, the first valve body 38 of the internal pressure control valve 32 rises and comes into contact with the seal portion 44 as shown in FIG. 3. The movement of gas from the fuel tank 14 into the canister 18 through the branch pipe 26 is restricted. The supplied fuel rises inside the filling pipe 16 and reaches the fuel gun. An autostop mechanism of the filling gun is actuated and the filling is stopped.

in this case, the internal pressure P of the fuel tank 14 is maintained at a pressure substantially equal to the head pressure in the filling pipe 16. Thus, the internal pressure P of the fuel tank 14 is prevented from dropping suddenly, and the level of liquid that is in contact with the filling gun inside the filling pipe 16 can be maintained. The autostop mechanism of the filling gun is uninterruptedly actuated and therefore the so-called overfilling is prevented.

In this state, the gas present inside the fuel tank 14 moves, although by very small portions, through the orifice 50 and into the canister 18. Therefore, within the time period from B to E in FIG. 5, the internal pressure P of the fuel tank 14 decreases gradually.

Where the second valve body 48 of the internal pressure control valve 32 rises and withdraws from the edge of the lower opening 40L, following slight fluctuations (rise) in the internal pressure P of the fuel tank 14, the gas moves from the fuel tank 14 into the canister 18 through the branch pipe 26, and the internal pressure of the fuel tank 14 drops. As a result, the second valve body 48 is also moved down and therefore again comes into contact with the edge of the lower opening 40L and prevents the gas from moving into the canister 18. Thus, as shown by a solid line and a two-dot-dash line in FIG. 4, the second valve body 48 repeatedly comes into contact with the edge of the lower opening 40L and withdraws therefrom (time period from B to C in FIG. 5).

Therefore, in the time period from B to D in FIG. 5, the internal pressure P of the tank gradually decreases over the entire period, while fluctuating up and down.

Stationary variations in time of the internal pressure P of the fuel tank in a comparative example are also shown by a two-dot-dash line L2 in FIG. 5. The fuel tank structure of the comparative example is identical to that of the present embodiment, except that the first valve body 38 of the present embodiment is not present. Therefore, the lower opening 36L of the valve housing 34 is opened and closed by the up-down movement of the second valve body 48.

In the fuel tank structure of the comparative example, the internal pressure P of the fuel tank 14 increases-decreases following the up-down movement of the second valve body 48. However, since this is not the structure in which the movement of gas from the fuel tank 14 into the canister 18 through the branch pipe 26 is, actively restricted (such predetermined resistance is offered), the internal pressure of the tank drops within a short interval after the point of time B and becomes less than the head pressure P1 of the filling pipe 16.

By contrast, in the fuel tank structure 12 of the present embodiment, the internal pressure P of the fuel tank 14 decreases gradually and therefore the state with the internal pressure P higher than the head pressure P1 of the filling pipe 16 can be maintained over a long period (time period from B to C in FIG. 5). In the filling pipe 16, the state in which the fuel reaches the filling gun can be maintained and the operation of the autostop mechanism is continued, As a result, the effect of inhibiting the so-called overfilling becomes stronger than that in the case, for example, of the fuel tank structure of the comparative example.

Even if a state in which the internal pressure P of the fuel tank 14 temporarily becomes lower than the head pressure P1 within this time period (time period from B to C), where such a state is maintained for a short period, the fuel present in the filling pipe 16 does not flow into the fuel tank 14. In other words, if the fuel present in the filling pipe 16 does not flow into the fuel tank 14, this means that the internal pressure P of the fuel tank 14 is maintained at the head pressure P1 in the filling pipe 16.

Where the internal pressure of the fuel tank 14 becomes equal to or lower than a predetermined value, the first valve body 38 descends. The leg portions 42 come into contact with the lower wall 34L of the valve housing 34 and a state is assumed in which the gas present inside the fuel tank 14 can move through the internal pressure control valve 32 (branch pipe 26) into the canister 18 (point of time E in FIG. 5).

Since the internal pressure control valve 32 is thereafter constantly opened (the cut-off valve 28 is also open), it is possible, for example, to drive an on-board diagnosis (OBD) pump (pump for failure diagnosis) provided in the canister 18, cause a predetermined pressure to act upon the fuel tank 14, and detect defects of the fuel tank 14.

FIG. 6 illustrates a fuel tank structure 72 of the second embodiment of the invention. In the second embodiment, two cut-off valves 28 are provided. Branch pipes 74 connected to those two cut-off valves 28 are merged in a merging portion 76 and connected by the branch pipe 26 before the cut-off valves 28 (the branch pipe 74 also constitutes part of the branch pipe 26). The two cut-off valves 28 are equivalent to each other, but are at different positions with respect to the fuel tank 14. Other features of the fuel tank structure 72 of the second embodiment are identical to those of the fuel tank structure 12 of the first embodiment.

Therefore, the effect demonstrated by the fuel tank structure 72 of the second embodiment is substantially similar to that demonstrated by the fuel tank structure 12 of the first embodiment. Further, in the fuel tank structure 72 of the second embodiment, since two cut-off valves 28 are provided at different positions, even if one cut-off valve 28 fails, for example, due to inclination of fuel level inside the fuel tank 14, it is highly probable that the other cut-off valve 28 will maintain the operating state.

From the standpoint of preventing the cut-off valves 28 from failure when the level of fuel inside the fuel tank 14 is tilted, a configuration provided with three or more cut-off valves 28 may be also used.

In the below-described configuration, the first valve body 38 is provided inside the valve housing 34 and the second valve body 48 is further provided inside the first valve body 38, but a specific configuration of the internal pressure control valve is not limited to the above-described configuration. Essentially, any internal pressure control valve may be used, provided that the movement of gas from the fuel tank 14 to the canister 18 can be prevented, for example, by increasing the flow channel resistance of the branch pipe 26 and maintaining the internal pressure of the fuel tank 14 for a predetermined time at the head pressure of the filling pipe 16 in a filled-up state of the fuel tank 14 (state in which the filled-up state regulating valve 24 is closed).

Further, the internal pressure of the fuel tank 14 can be maintained at the head pressure of the filling pipe 16 even with the internal pressure control valve of a structure in which no orifice 50 is formed. However, since there is no gas movement induced by the orifice 50, the internal pressure of the fuel tank 14 should be reduced and the internal pressure control valve should be opened only by the up-down movement of the second valve body 48 (long time is required and the control becomes difficult). By contrast, in the configuration having the orifice 50, the gas present inside the fuel tank 14 is caused to move in a predetermined amount per unit time through the orifice 50 into the canister 18. Therefore, the internal tank pressure can be reliably reduced within a short time and a transition to the open state of the internal pressure control valve 32 can be made.

In the configuration described hereinabove, the common pipe 20 and the branch pipe 26 are integrated at the canister 18 side of the filled-up state regulating valve 24, but the common pipe 20 and the branch pipe 26 may be also configured completely separately and independently from each other. In any configuration, the internal pressure control valve in accordance with the invention may be provided in the second pipe.

What is claimed is:

1. A fuel tank structure comprising:
   a fuel tank that accommodates a fuel inside thereof;
   a canister having an absorber that adsorbs fuel vapor present in the fuel tank;
   a filled-up state regulating valve disposed inside the fuel tank and in a closed state when a fuel level inside the fuel tank reaches a predetermined filled-up state liquid level;
   a common pipe that communicates the filled-up state regulating valve and the canister;
   a branch pipe that extends from the upper portion of the filled-up state regulating valve and that is provided inside the fuel tank;
   a filling pipe that supplies fuel to the fuel tank and extends from the fuel tank to a position that is higher than the filled-up state liquid level;
   a valve housing attached to the branch pipe;
   a first valve body, disposed in the valve housing, that restricts gas movement in the valve hosing by closing an upper opening of the valve housing when the first valve body rises to a position in which the gas movement in the valve housing is allowed due to an internal pressure of the fuel tank being in a state where the fuel level inside the fuel tank is in a filled-up state;
   a clearance formed between the valve housing and the first valve body;
   a second valve body that closes a lower opening of the first valve body, and that allows the gas movement to the upper opening of the valve housing through an inside of the first valve body by opening the lower opening when the second valve body rises due to the internal pressure of the fuel tank; and
   an orifice formed in the first valve body that allows the gas movement between the clearance and the inside of the first valve body, the orifice having a resistance to the gas movement in a state where the second valve body closes the lower opening of the first valve body.

2. The fuel tank structure according to claim 1, further comprising a first cut-off valve that is provided in the second pipe at a position that is higher than the filled-up state liquid level inside the fuel tank, and is configured to open the second pipe when the internal pressure of the fuel tank exceeds a predetermined value.

3. The fuel tank structure according to claim 2, further comprising a second cut-off valve provided in the second pipe at a position different than the first cut-off valve, and is configured to open the second pipe when the internal pressure of the fuel tank exceeds a predetermined value.

4. The fuel tank structure according to claim 1, wherein the valve housing is moved from an open valve position to a closed valve position by the internal pressure of the fuel tank when the fuel tank is in and the filled-up state, and the valve housing restricts the gas movement from the fuel tank to the canister through the second pipe.

5. The fuel tank structure according to claim 4, wherein the orifice creates a resistance to the gas movement from the fuel tank to the canister when the valve housing is moved to the open valve position.

6. The fuel tank structure according to claim 1, wherein the valve housing includes:
- the first valve body that is moved from an open valve position to a closed valve position by the internal pressure of the fuel tank when the fuel tank is in the filled-up state; and
- the second valve body that is moved from a closed valve position to an open valve position by a pressure substantially equal to a head pressure of the fuel remaining inside the filling pipe.

7. The fuel tank structure according to claim 6, wherein the first valve body is a float valve.

8. The fuel tank structure according to claim 6, wherein the second valve body is accommodated inside the first valve body.

* * * * *